(12) United States Patent
Henry et al.

(10) Patent No.: US 7,600,040 B1
(45) Date of Patent: Oct. 6, 2009

(54) BUFFERING PACKETS DESTINED FOR A MOBILE DEVICE WHILE THE MOBILE DEVICE MOVES FROM ONE NETWORK TO ANOTHER NETWORK TO PREVENT HANDOFF PACKET LOSS

(75) Inventors: Paul Shala Henry, Holmdel, NJ (US); Hui Luo, Marlboro, NJ (US)

(73) Assignee: AT&T Corp., New York, NY (US)

( * ) Notice: Subject to any disclaimer, the term of this patent is extended or adjusted under 35 U.S.C. 154(b) by 898 days.

(21) Appl. No.: 10/183,816

(22) Filed: Jun. 27, 2002

(51) Int. Cl.
 *G06F 13/00* (2006.01)
(52) U.S. Cl. ..................................................... 709/238
(58) Field of Classification Search ................. 709/238, 709/242; 370/328, 352; 455/436–445
 See application file for complete search history.

(56) References Cited

U.S. PATENT DOCUMENTS 6,510,144 B1 * 1/2003 Dommety et al. ........... 370/328
6,985,463 B1 * 1/2006 Wright et al. ................ 370/331

OTHER PUBLICATIONS

"Buffer Management for Smooth HandOvers in Mobile IPv6" by Krishnamurthi et al., *Mobile IP Working Group*, Internet Draft, http:// www.iprg.nokia.com/-charliep/txt/mobilebuf/buiffer6.txt, Date: Jul. 13, 2000.

"Behavior of a Mobiilty Agent in Mobile IP in order to Manage the Flow" by Ishibashi, et al., *Mobile IP Working Group*, Internet Draft, http://216.239.51.100/search?q=cache:qRJDor5o5WwC:www/ietf. org/internet-drafts/draft, Date: Oct. 2001.

* cited by examiner

*Primary Examiner*—Robert B Harrell

(57) ABSTRACT

A method and system for preventing packet loss during handoff of a mobile host between access networks. In accordance with an aspect of the invention, a home agent on a network maintains a FIFO (First In-First Out) buffer for every mobile host that it serves. When a packet destined for a particular mobile host is received at the home agent, it is assigned an incremental sequence number, encapsulated as an IP packet, and forwarded to the mobile host with the sequence number as an identifier. The packet and sequence number are thereafter stored in the buffer for a period of time after the packet was forwarded to the mobile host. After hand-off to the arriving network is completed, the mobile host sends the sequence number of the last-received IP packet to the home agent and the new care-of IP address. Using this sequence number, the home agent then determines whether any incoming packets had been routed to the previous care-of IP address. These are retrieved from the buffer, and resent to the new care-of IP address.

8 Claims, 3 Drawing Sheets

BUFFERING PACKETS DESTINED FOR A MOBILE DEVICE WHILE THE MOBILE DEVICE MOVES FROM ONE NETWORK TO ANOTHER NETWORK TO PREVENT HANDOFF PACKET LOSS

FIELD OF THE INVENTION

The present invention relates generally to mobile networking, and more particularly, to a method and system for preventing loss of packets at a mobile host that is handed off from a first (i.e., departing) access network to a second (i.e., arriving) access network.

BACKGROUND

A user having a network access device (mobile host), who moves from a location covered by the user's home network to another location covered by a foreign access network, can be characterized as "roaming" between networks. Typically, the complicated handoff procedure that enables the mobile host to gain access to the new network can cause QoS problems. When the mobile host moves from the coverage of one network and roams into the coverage of the new or "arriving" network, three basic actions occur to effectuate a handoff: (1) the mobile host authenticates to the arriving network; (2) the arriving network allocates resources for the mobile host; and (3) the departing network releases any resources allocated to the mobile host. During the handoff process, some data packets that were forwarded to the mobile host from the mobile host's home agent can be dropped. Typically, this occurs when the home agent has not yet been updated with a new care-of IP address for the mobile host corresponding to the arriving network, and packets are still being routed to the departing network at the old care-of IP address. The home agent will route packets to the old care-of IP address until it is updated with a new care-of IP address. Since the mobile host or a foreign agent on the network provides the home agent with the new care-of IP address after the hand-off process is complete, packet loss is likely. This can occur during handoffs between different types of access networks or between access networks under different administrations.

One proposed solution to this problem is referred to as "bicasting." See e.g., Koichi Ishibashi, Keiichi Shimizu, and Shoichiro Seno, "Behavior of A Mobility Agent in Mobile IP in order to manage the flow," Internet Draft, October 2001, see the Internet Engineering Task Force web site, for example at www.ietf.org/internet-drafts/draft-ishi-mobileip-behavior-ma-00.txt. In bicasting, a mobile host or a foreign agent on the departing access network updates the home agent with a new care-of IP address before the handoff procedure is initiated. This action triggers the home agent to forward incoming packets to each of the arriving and departing access networks. The mobile host (or foreign agent on the arriving access network) subsequently notifies the home agent after the handoff process is complete. In response, the home agent stops bicasting incoming packets. If the mobile host is capable of receiving only one wireless signal at a time, bicasting requires foreign agents being deployed on the access networks. If the mobile host is capable of simultaneously receiving multiple wireless signals, the deployment of a foreign agent is not required. The bicasting technique was designed for low-latency applications. Two round trips of signaling messages are necessary to effectuate a handoff: one to indicate when the handoff begins, and the other to indicate when the handoff ends. Consequently, if a blackout period occurs during the handoff procedure, packet loss will be inevitable if the foreign agent cannot buffer the packets. Moreover, packet loss may occur if the departing access network unexpectedly fails, thereby depriving the mobile host of any opportunity to notify the home agent that handoff to the arriving network has started. Although lost packets can be recovered by a transmission control protocol (TCP) if they belong to a TCP connection, such loss negatively impacts the throughput of the TCP connection. The TCP will interpret the packet loss due to network congestion, and will thus slow the packet transmission.

Another technique is known as "re-tunneling." See, Govind Krishnamurthi, Robert C. Chalmers, and Charles E. Perkins, "Buffer Management for Smooth Handovers in IPv6", Internet Draft, July 2000, http://www.iprg.nokia.com/~charliep/txt/mobilebuf/buffer6.txt. In re-tunneling, the home agent, mobile host or a foreign agent (with a suitable buffer) on the arriving access network, provides the new care-of IP address to the foreign agent on the departing network, such that it can re-tunnel incoming packets to the new care-of IP address. The re-tunnel procedure has been proposed for low-loss applications under the assumption that the transmission delay between two foreign agents is significantly smaller than the delay between a foreign agent and a home agent. Using this methodology, two round trips of signaling messages are required for handoff: the first to send the new care-of IP address to the home agent, and the second to send the new care-of IP address to the foreign agent on the previous access network. As with bicasting, packet loss can occur if the departing access network unexpectedly fails or corrupts, thereby depriving the mobile host of any opportunity to notify the foreign agent that handoff to the arriving network has started.

Another method referred to as "retrieve-and-resend," is similar to retunneling discussed above. However, here the re-tunnel procedure is performed by the home agent in lieu of the foreign agent.

In typical IP mobility configurations where the mobile host is capable of receiving only one wireless signal, the foregoing methods are unsuitable without support from foreign agents.

SUMMARY OF THE INVENTION

In accordance with an aspect of the invention, a home agent maintains a FIFO (First In-First Out) buffer for every mobile host that it serves. When a packet destined for a particular mobile host is received at the home agent, it is assigned an incremental sequence number, encapsulated as an IP packet, and forwarded to the mobile host with the sequence number as an identifier. The packet and sequence number are thereafter stored in the buffer for a period of time after the packet was forwarded to the mobile host. After hand-off to the arriving network is completed, the mobile host sends the sequence number of the last-received IP packet to the home agent and the new care-of IP address. Using this sequence number, the home agent then determines whether any incoming packets had been routed to the previous care-of IP address. These are retrieved from the buffer, and resent to the new care-of IP address.

The invention will now be described in detail with particular reference to the accompanying drawings.

DETAILED DESCRIPTION OF THE PREFERRED EMBODIMENTS

Figure 1:
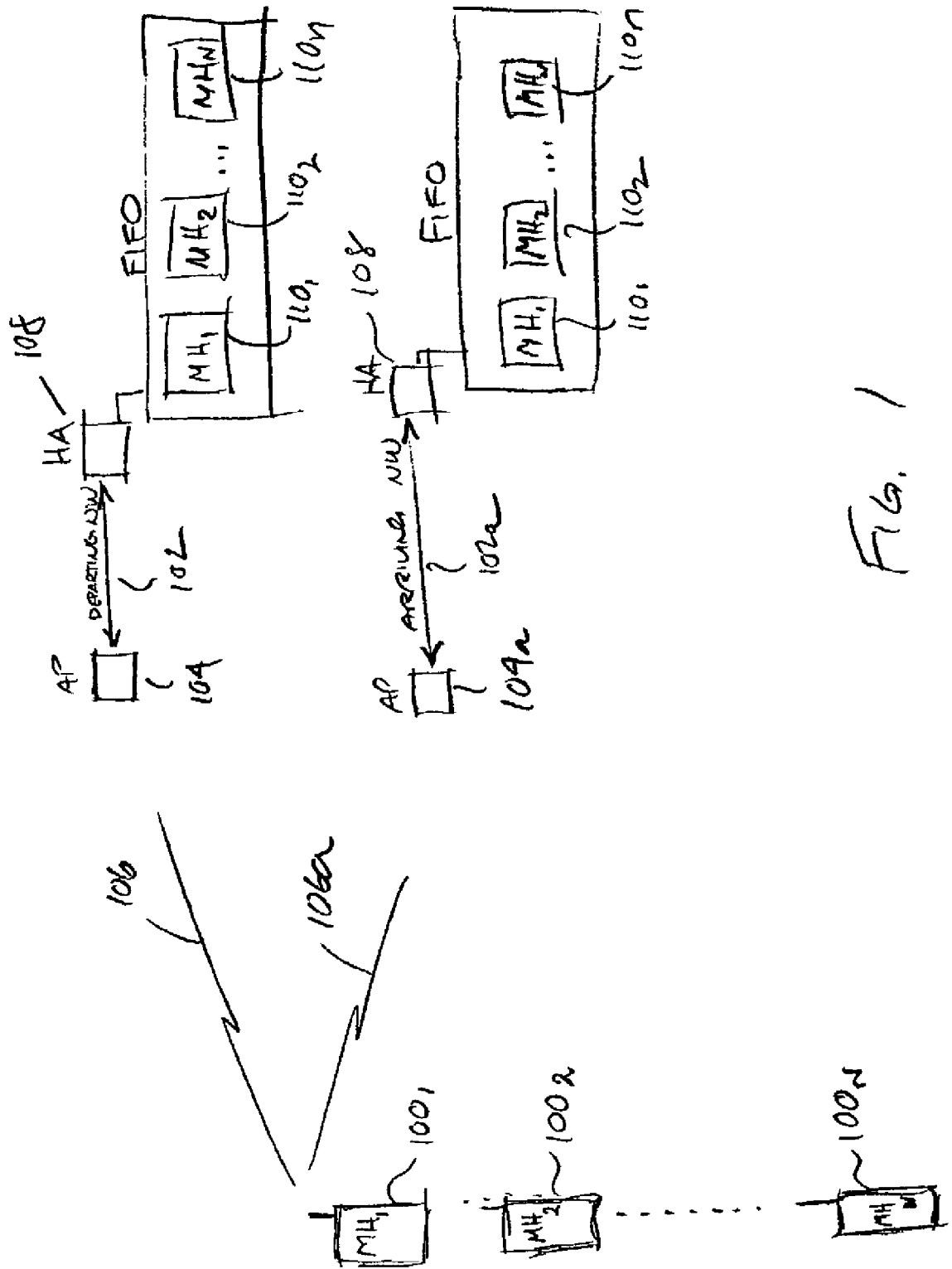
FIG. 1 is a schematic depicting a plurality of mobile hosts and first and second access networks.

With reference now to the several views of the drawings, there is generally depicted an in-band buffer control protocol between a mobile host (network access device) and a home agent, and a first-in first-out (FIFO) buffer at the home agent. FIG. 1 is a schematic depicting a plurality of mobile hosts 100 (network access devices). The first mobile host 100 ($MH_1$) is connected to an access network 102 via an access point (AP) 104. The connection is shown schematically at 106. When the mobile host 100 leaves access network 102 (the "departing network") and roams into the coverage of a second access network 102a (the "arriving network"), it initiates a handoff procedure with the arriving network via the access point 104a as is well known in the art of wireless communications. Three basic actions occur to effectuate a handoff: (1) the mobile host authenticates to the arriving network; (2) the arriving network allocates resources for the mobile host; and (3) the departing network releases any resources allocated to the mobile host. Packets destined for the mobile host 100 are always forwarded to the current care-of IP address for the mobile host 100 from a home agent 108. In accordance with an aspect of the present invention, the home agent 108 is configured to maintain a plurality of FIFO buffers $110_{1,2...n}$ for respective mobile hosts $100_{1,2...n}$ that it serves. The home agent 108 is appropriately programmed such that when it receives an incoming packet to be forwarded to a mobile host $100_{1,2...n}$, it assigns an incremental sequence number to that packet, and forwards the packet and sequence number to the current care-of IP address of the mobile host $100_{1,2,n}$. The sequence number is a circularly incremental number that returns to zero after reaching a maximum value. The home agent 108 then stores the packet and sequence number at the end of the buffer $110_{1,2...n}$ associated with the mobile host $100_{1,2...n}$. If the buffer is full, the home agent 108 dumps the packet and associated sequence number at the head of the buffer $110_{1,2...n}$. Each mobile host is configured to maintain a variable in memory to record the sequence number of the last-received packet from the home agent 108. After the mobile host is handed off to the arriving network, it sends the last recorded sequence number and the new care-of IP address to the home agent 108. The home agent 108 subsequently checks the buffer $110_{1,2...n}$ for the packet with the same sequence number as the one received from the mobile host $100_{1,2...n}$. If the home agent locates the same packet in the buffer, it re-sends all packets beginning with the next packet (i.e., the packet received earlier from the network) from the one corresponding to the sequence number received from the mobile host. All other packets (i.e., with higher sequence numbers) are dumped. If the home agent 108 cannot locate the packet identified by the sequence number, it re-sends all packets in the buffer. Since a mobile host $100_{1,2n}$ may send several identical care-of IP address registration messages to the home agent 108 with the same last-received sequence number, the home agent 108 only re-sends buffered packets when it receives the first care-of IP address registration message, and ignores any subsequently received care-of IP address registration messages that are identical to the first one. This phenomenon can occur if the home agent's reply to the mobile host's care-of IP address registration message is lost. The home agent 108 will stop ignoring consequent registration messages and again re-send buffered packets after receiving a new care-of IP address registration message with a different care-of IP address or last-received sequence number. When the home agent 108 receives a packet from the mobile host, it can dump packets from the buffer starting with the last-received sequence number in order to save memory space. In accordance with this process, packets corresponding to sequence numbers lower than the number last received from the mobile host are continually dumped from the buffer.

Figure 2:
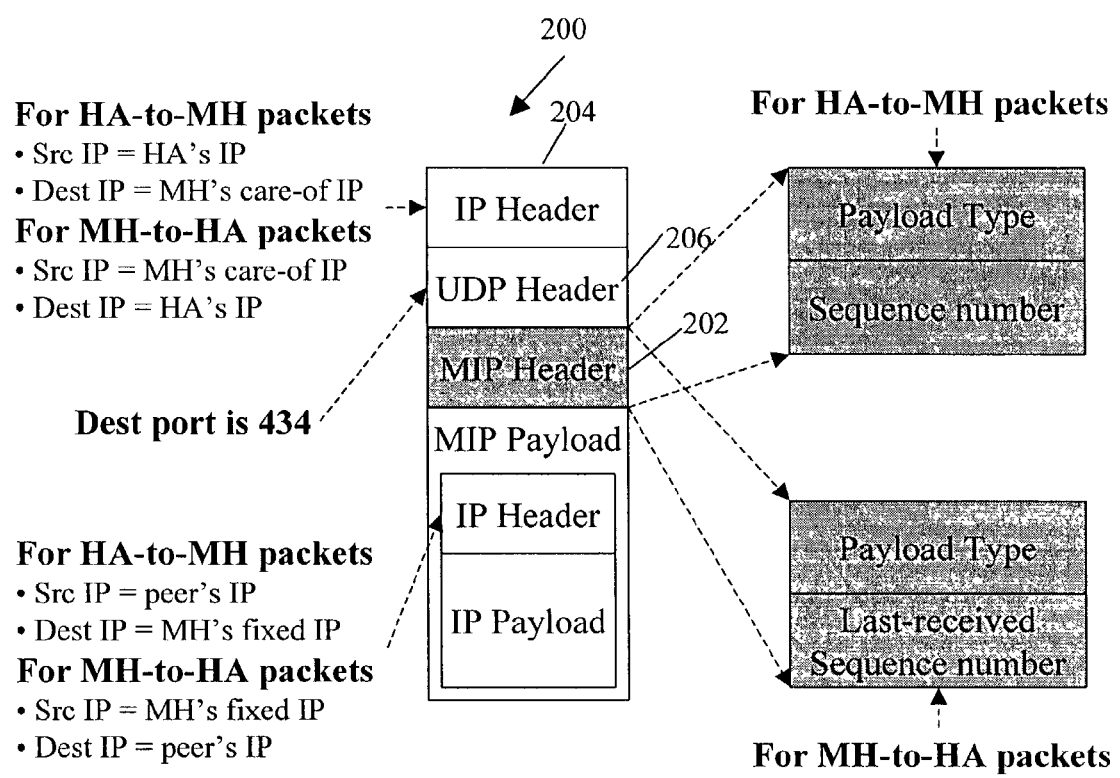
FIG. 2 is a schematic of a first data structure for a method utilized to transmit buffer control signaling messages between a mobile host and a home agent in accordance with an aspect of the invention.
Figure 3:
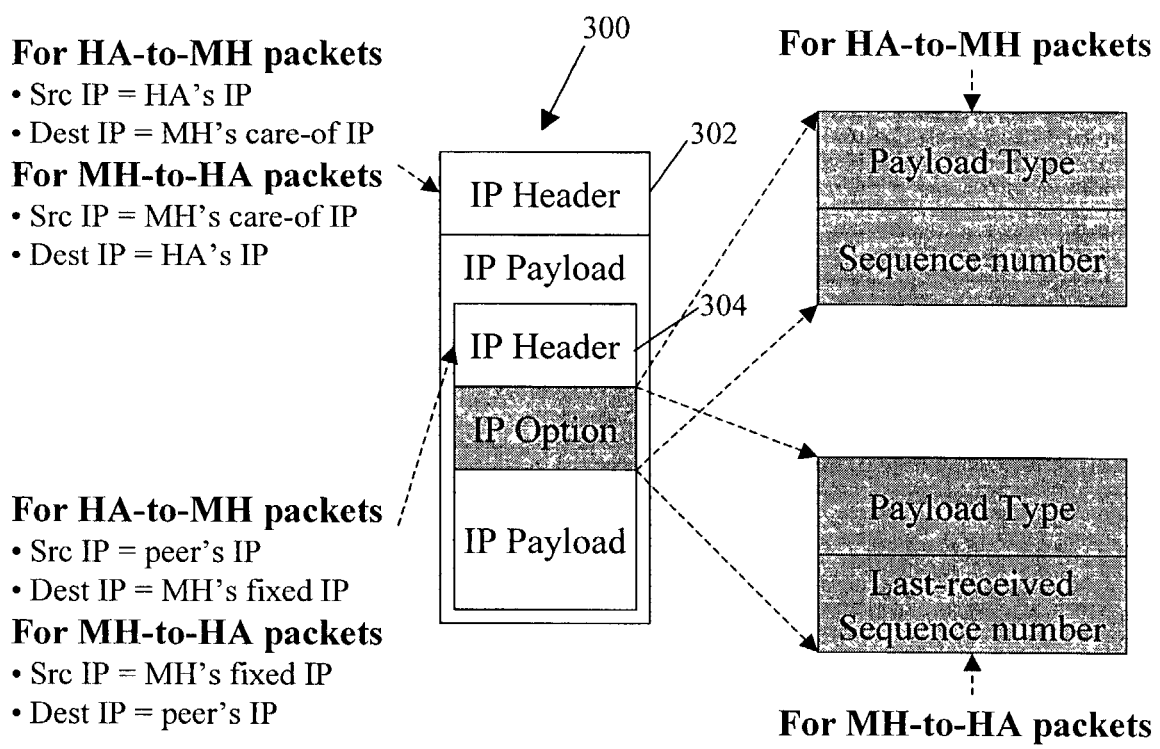
FIG. 3 is a schematic of a second data structure for a method utilized to transmit buffer control signaling messages between a mobile host and a home agent in accordance with another aspect of the invention.

FIGS. 2 and 3 are schematics of data structures for two basic methods utilized to transmit buffer control signaling messages between the mobile host and home agent. In the first shown in FIG. 2, signaling messages are imbedded in Mobile IP (MIP) headers; and in the second depicted in FIG. 3, signaling messages are inserted into the inner IP packet as IP options. In FIG. 2, every IP packet sent between the mobile host and home agent is encapsulated in an MIP packet 200. The buffer control signaling messages are embedded in a MIP header 202. In the exemplary format for a packet sent from the home agent to mobile host, an IP header 204 contains the home agent's IP address as the source IP address (Src IP=HA IP) and the mobile host's care-of IP address as the destination IP address (Dest IP=MH care-of IP). The UPD header 206 has a destination UDP port set to 434. The MIP header 202 contains the payload type, such as a MIP signaling message or an IP packet (in FIG. 2 it is identified as an IP packet), and a sequence number if the payload is an IP packet. For a MIP packet sent from the mobile host to home agent, the IP header 204 contains the mobile host's care-of IP address as the source IP address, and the home agent's IP address as the destination IP address. The destination UDP port is 434. The MIP header 202 contains the payload type, and the sequence number of the IP packet that was the last one received by the mobile host. This signaling protocol can be utilized in configurations where no foreign agent is deployed on the network. All signaling messages can be protected by message authentication codes, thus providing improved security over a CRC checksum.

Referring now to FIG. 3, an embodiment is depicted where a foreign agent on the network encapsulates and decapsulates IP packets on behalf of the mobile host. In this arrangement, buffer control signaling messages are inserted into the encapsulated IP packets as an IP option. An IP-in-IP packet 300 sent from the home agent to mobile host has a header 302 with an outer source IP address set to the home agent's IP address. The outer destination IP address is the mobile host's care-of IP address (which could be a foreign agent's IP address). The inner destination IP address is the mobile host's fixed IP address, which belongs to the subnet of the home agent. A sequence number is assigned to the inner IP packet by the home agent and inserted as the first IP option 304 of the inner IP packet. For a packet sent from the mobile host to the home agent, the IP-in-IP packet has an outer source IP address set to the mobile host's care-of IP address (which could be a foreign agent's IP address). The inner source IP address is the mobile host's fixed IP address, which belongs to the subnet of the home agent. The sequence number of the last-received incoming IP packet is inserted as the first IP option of the inner IP packet. This signaling protocol can be utilized irrespective of whether or not a foreign agent is deployed on the network.

In summary, the over-buffer approach in accordance with the present invention can be applied to the most primitive IP mobility scenario where the mobile host has only one radio and does not receive support from foreign agents. It only requires one round trip of signaling messages for handoff—to report the new care-of IP address of the mobile host and the sequence number of the last-received IP packet to the home agent. It can avoid packet loss during handoff, no matter what the cause, if the buffer size in the home agent is big enough. Its implementation is very simple and efficient. In order to minimize retransmission delays where the home agent is far away from the mobile host, the home agent can be disposed close to a high-speed backbone. The home agent should be provided with a large memory capacity for the buffers. Additional memory allocated by distributing the home agent function across a network of small computers, such that each computer serves only a small number of mobile hosts and therefore requires a relatively small amount of memory for buffers. In this expedient, a mobility proxy would be used at the network firewall to enable communication between the mobile hosts and the computers serving as home agents.

The present invention has been shown and described in what is considered to be the most practical and preferred embodiment. It is anticipated, however, that departures can be made therefrom and that obvious modifications will be implemented by those skilled in the art.

The invention claimed is:

1. A method of preventing packet loss during handoff of a network access device from a first access network to a second access network, the method being performed by a home agent for the network access device and comprising steps of:
   forwarding from the home agent a plurality of packets destined for the network access device and sequence numbers for the packets to a current care-of Internet Protocol (IP) address for the network access device;
   buffering at the home agent, in a respective buffer associated with the network device of a plurality of buffers at the home agent, the plurality of packets destined for the network access device in accordance with said sequence numbers, wherein each one of said plurality of buffers supports a different network access device;
   receiving at the home agent the sequence number from the network access device that was last received by the network access device after handoff to the second access network, and receiving a new care-of IP address for the network access device on the second network; and
   resending from the home agent packets to the network access device at the new care-of IP address, starting with the last received sequence number from the network access device after handoff to the second access network, wherein the home agent is a single device in performing all of said forwarding step, said buffering step, said receiving step and said resending step.

2. The method recited in claim 1, wherein the packets are stored in a First In-First Out (FIFO) buffer with the last packet received at the end of the buffer.

3. The method recited in claim 1, wherein buffer control signaling messages received from the network access device and sent to the network access device are embedded in Mobile IP headers.

4. The method recited in claim 1, wherein buffer control signaling messages received from the network access device and sent to the network access device are inserted as an IP option in encapsulated IP packets.

5. A method of preventing packet loss during handoff of a network access device from a first access network to a second access network, the method being performed by a home agent for the network access device and comprising steps of:
   assigning at the home agent a sequence number to each of a plurality of packets destined for the network access device;
   forwarding from the home agent the packets and sequence numbers to a current care-of Internet Protocol (IP) address for the network access device;
   sequentially storing the packets in a respective buffer associated with the network access device of a plurality of buffers at the home agent, wherein each one of said plurality of buffers supports a different network access device;
   receiving at the home agent the sequence number from the network access device that was last received by the network access device from the home agent after handoff to the second access network, and receiving a new care-of IP address for the network access device on the second network; and
   resending from the home agent packets to the network access device at the new care-of IP address, starting with the last received sequence number from the network access device after handoff to the second access network, wherein the home agent is a single device in performing all of said assigning step, said forwarding step, said storing step, said receiving step and said resending step.

6. The method recited in claim 5, wherein the home agent re-sends buffered packets to the network access device upon receiving the sequence number that identifies the last received packets, and further wherein the packets will not be re-sent to the network access device until the sequence number or the care-of IP address is changed.

7. A computer readable storage medium embodying executable program instructions that, when executed by a processor, enable a home agent on a network to prevent packet loss during handoff of a network access device from a first access network to a second access network by comprising:
   forwarding from the home agent a plurality of packets destined for the network access device and sequence numbers for the packets to a current care-of Internet Protocol (IP) address for the network access device;
   buffering at the home agent, in a respective buffer associated with the network device of a plurality of buffers at the home agent, the plurality of packets destined for the network access device in accordance with said sequence numbers, wherein each one of said plurality of buffers supports a different network access device; and
   resending from the home agent packets to the network access device at a new care-of IP address, starting with the first sequence number received by the home agent from the network access device after handoff to the second access network, wherein the home agent is a single device in performing all of said forwarding, said buffering and said resending.

8. A computer readable storage medium embodying executable program instructions that, when executed by a processor, enable a home agent on a network to prevent packet loss during handoff of a network access device from a first access network to a second access network comprising:
   assigning at the home agent a sequence number to each of a plurality of packets destined for the network access device;
   forwarding from the home agent the packets and sequence numbers to a current care-of Internet Protocol (IP) address for the network access device;
   sequentially storing the packets in a respective buffer associated with the network access device of a plurality of buffers at the home agent, wherein each one of said plurality of buffers supports a different network access device;

receiving at the home agent the sequence number from the network access device that was last received by the network access device from the home agent after handoff to the second access network, and receiving a new care-of IP address for the network access device on the second network; and resending from the home agent packets to the network access device at the new care-of IP address, starting with the last received sequence number from the network access device after handoff to the second access network, wherein the home agent is a single device in performing all of said assigning, said forwarding, said storing, said receiving and said resending.

* * * * *